Nov. 22, 1966 E. J. HUNTER 3,286,733
IRRIGATION CONTROLLER
Filed June 8, 1964 3 Sheets-Sheet 1
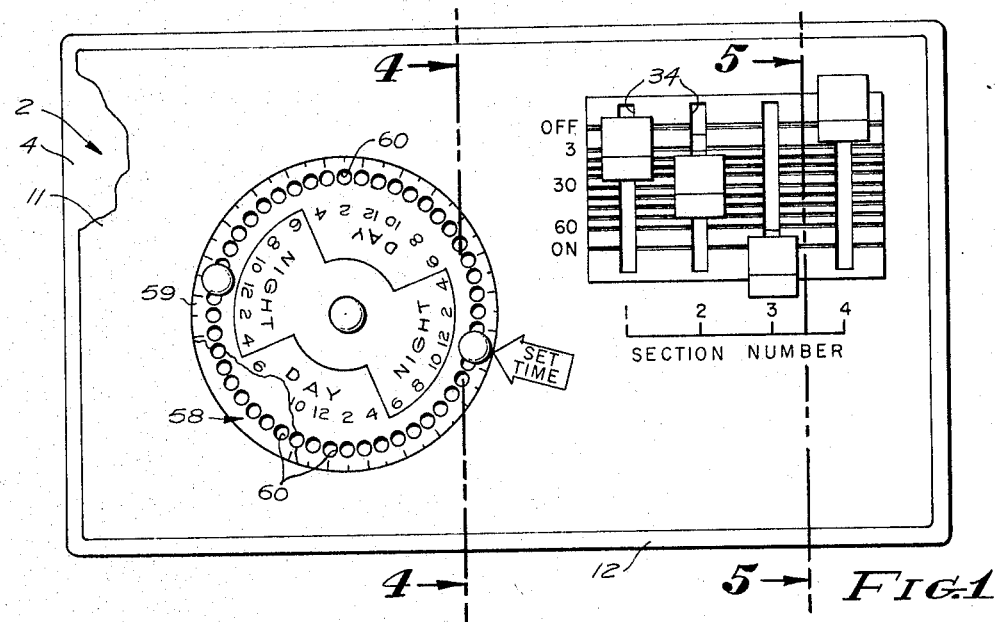
FIG. 1
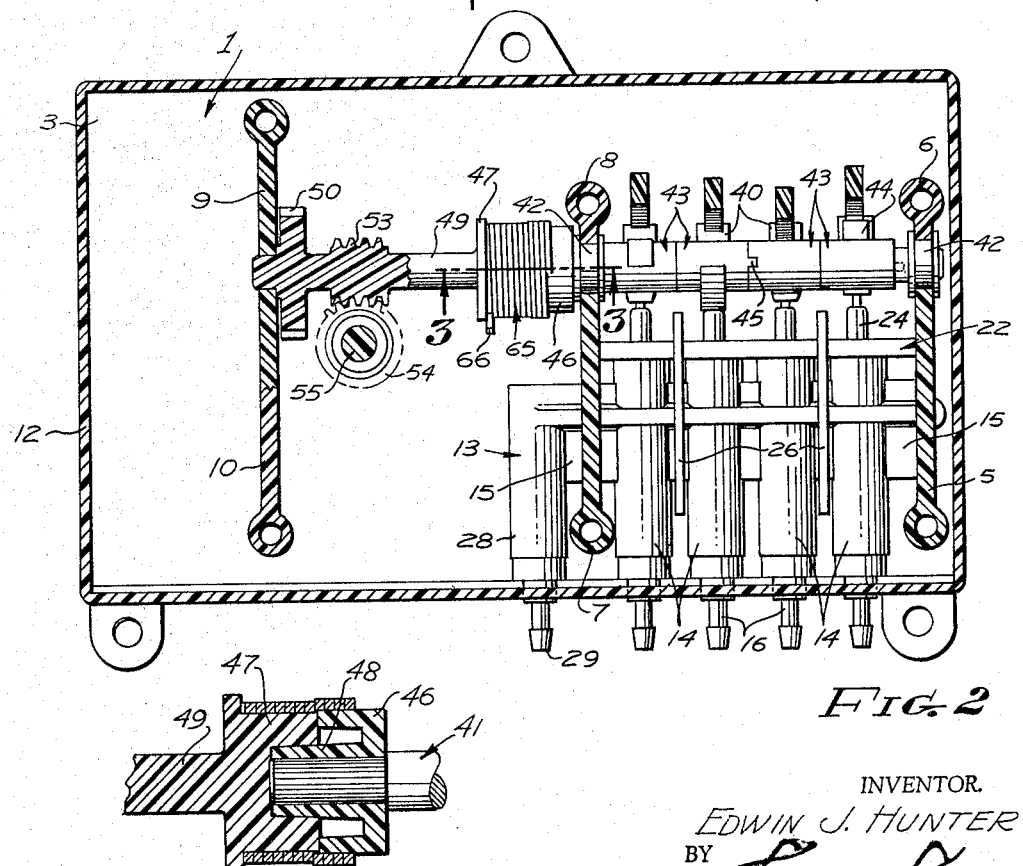
FIG. 2
FIG. 3
INVENTOR.
EDWIN J. HUNTER
BY Lyon & Lyon
ATTORNEYS Nov. 22, 1966  E. J. HUNTER  3,286,733
IRRIGATION CONTROLLER
Filed June 8, 1964  3 Sheets-Sheet 2
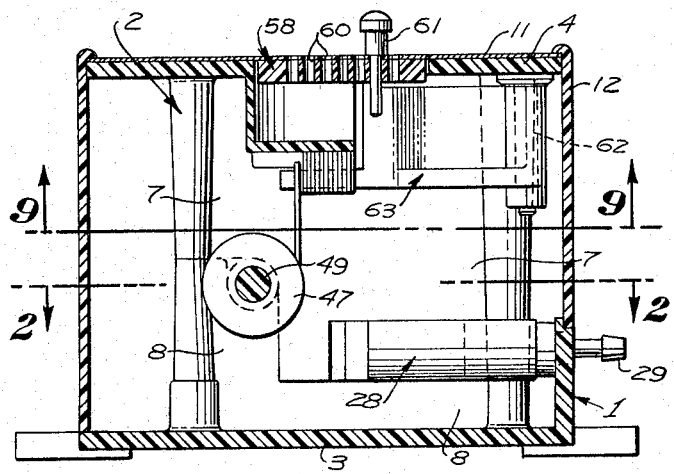
FIG. 4
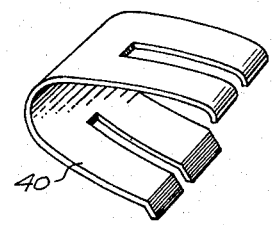
FIG. 8
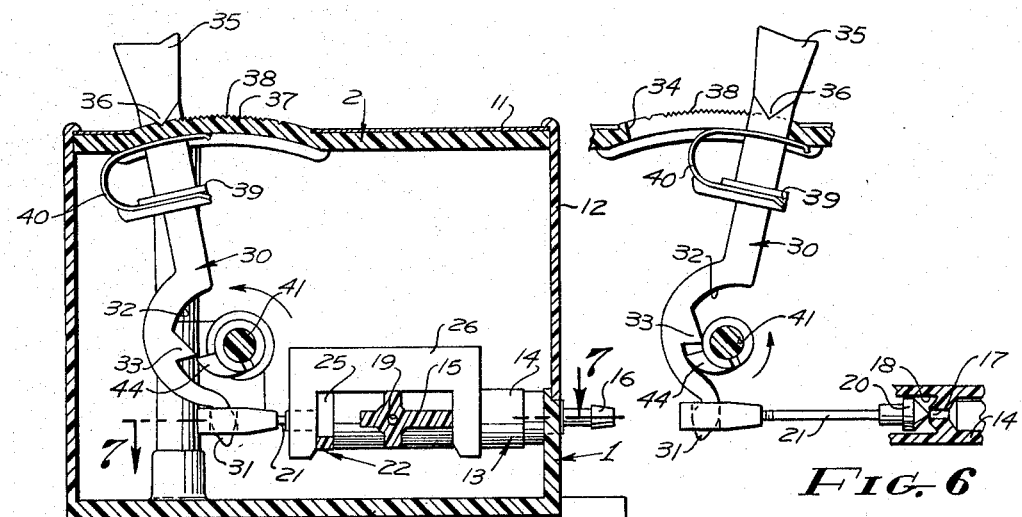
FIG. 5  FIG. 6
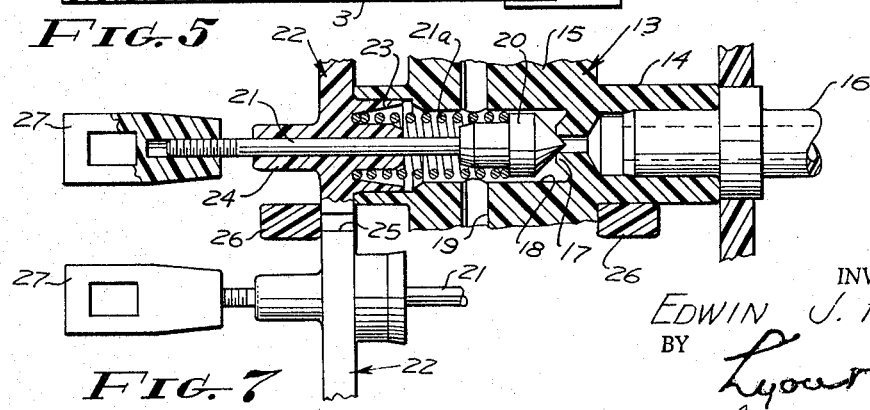
FIG. 7
INVENTOR.
EDWIN J. HUNTER
ATTORNEYS INVENTOR.
EDWIN J. HUNTER
BY
*Lyon Lyon*
ATTORNEYS

United States Patent Office 3,286,733
Patented Nov. 22, 1966

3,286,733
IRRIGATION CONTROLLER
Edwin J. Hunter, Riverside, Calif., assignor to Moist O'Matic, Inc., Riverside, Calif., a corporation of Minnesota
Filed June 8, 1964, Ser. No. 373,316
5 Claims. (Cl. 137—624.2)

This invention relates to irrigation controllers, more particularly to irrigation controllers of the type shown in Patent No. 2,821,434 issued January 28, 1958, to Edwin J. Hunter and Lorenzo A. Richards.

Included in the objects of this invention are:

First, to provide a particularly compact irrigation controller so arranged that it may be readily and quickly assembled from molded plastic parts.

Second, to provide an irrigation controller which incorporates a multiple pilot valve assembly, having a minimum of easily fabricated and assembled parts.

Third, to provide an irrigation controller which incorporates a novelly arranged time controlled drive and clutch means whereby the controller is caused at a predetermined time to undergo a predetermined cycle of operation.

Fourth, to provide an irrigation controller for a plurality of sprinkler sections wherein the sprinkling interval of each section may be adjusted, or rendered inoperative, or manually operated as desired without disturbing the adjustment and operation of the other sprinkler sections.

Fifth, to provide in an irrigation controller of this type a novel control cam element whereby identical cam elements may be interconnected in a row to provide a predetermined sequencing of operation.

With the above and other objects in view as may appear hereinafter, reference is directed to the accompanying drawings in which:

FIGURE 1 is a top view of the irrigation controller.

FIGURE 2 is a sectional view thereof taken substantially through 2—2 of FIGURE 4.

FIGURE 3 is an enlarged fragmentary sectional view of the drive shaft and drive clutch taken through 3—3 of FIGURE 2.

FIGURE 4 is a transverse sectional view taken substantially through 4—4 of FIGURE 1.

FIGURE 5 is a transverse sectional view taken through 5—5 of FIGURE 1 showing one of the control units in its OFF position.

FIGURE 6 is a fragmentary sectional view similar to FIGURE 5 showing a control unit in its ON position.

FIGURE 7 is an enlarge fragmentary sectional view taken through 7—7 of FIGURE 5 showing, particularly, a portion of the movable valve structure.

FIGURE 8 is a perspective view of a leaf spring employed in a control unit.

Figure 9:
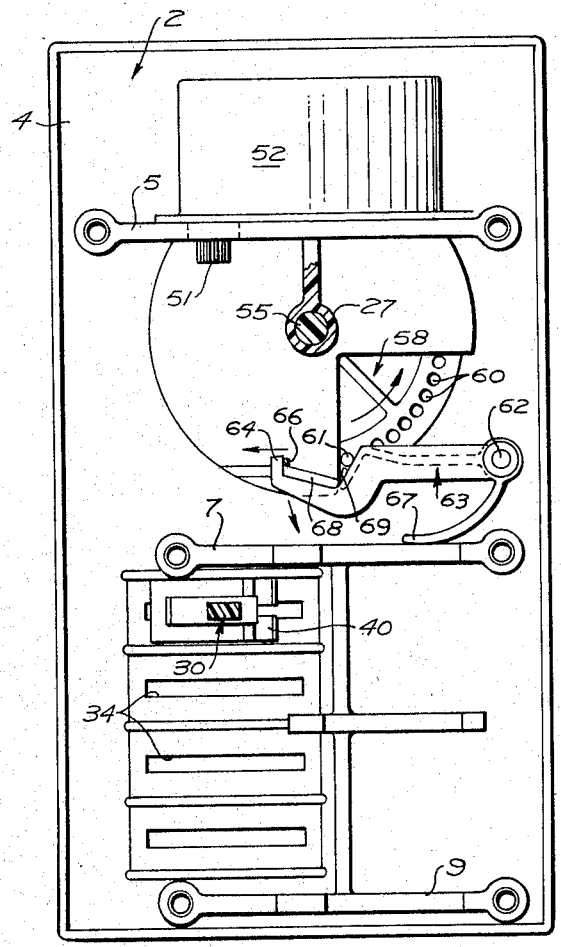
FIGURE 9 is a longitudinal sectional view taken substantially through 9—9 of FIGURE 4 showing a view in the opposite direction from FIGURE 2.
Figure 10:
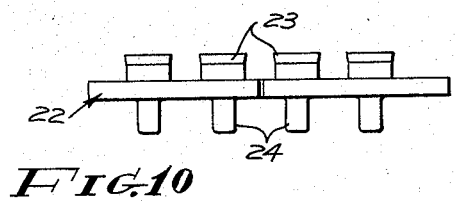
FIGURE 10 is an edge view of the valve cover strip.

The irrigation controller includes a lower frame structure 1 and an upper frame structure 2, having respectively a rectangular base plate 3 and top plate 4. The frame structures are joined together by complementary partitions 5 and 6, 7 and 8, 9 and 10, which are adapted to be separated from each other in a manner to permit assembly of operating portions of the irrigation controller. The top plate 4 is covered with an escutcheon plate 11. A shell 12 may surround the frame structures or the frame structures may be mounted in a housing having an aperture which exposes the escutcheon plate 11.

Clamped upon the partitions 5 and 6, 7 and 8, is a multiple pilot valve structure 13 which, in the structure shown, includes four cylindrical valve bodies 14. The valve bodies 14 are connected by a transverse web 15. The bore of each valve body 14 receives a fitting 16 at one end for connection to a pilot line, not shown. Inwardly of each fitting 16 there is formed, in the corresponding bore, a valve seat 17 which is directed into a cylindrical valve chamber 18. The valve chambers of the four valve bodies are interconnected by a supply passage 19 extending through the web 15.

Each valve chamber 18 receives a valve element 20, one end of which engages the corresponding seat 17 and the other end of which is joined to a stem 21 which protrudes from the valve body. The ends of the valve bodies 14 opposite from the fittings 16 are covered by a cover strip 22 having seal cups 23 which fit into enlarged outer ends of the valve chambers 18. Centered within each seal cup 23 is a guide sleeve 24 which receives a corresponding stem 21. Springs 21a urge the valve elements toward their respective seats.

Figure 11:
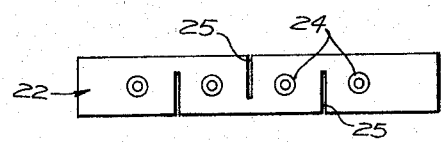
FIGURE 11 is a side view thereof of the valve cover strip.

The valves and cover strip are formed of tough, slightly yieldable, plastic material such as polyethylene. In order that the seal cups 23 and guide sleeves 24 align properly with each valve element, the cover strip is provided with slots 25 extending part way therethrough as best shown in FIGURE 11. The cover strip 22 and valve bodies 14 are held together by channel shaped retainer clips 26 which bridge across the web 15 so as to overlie the web and the cover strip as shown best in FIGURES 2 and 5. The extended ends of the stems 21 are screw-threaded and receive loop elements 27 molded of plastic material, each having a rectangular aperture therein.

At one end, the valve structure is provided with a cylinder 28 which parallels the valve bodies 14 and is provided with a fitting 29 for connection to a bleed line. The supply passage 19 communicates with the cylinder 28.

The pilot valve units of the valve structure are operated by a set of timing levers 30. Each timing lever has an actuating tip 31 which is received in the corresponding loop elements 27. Adjacent the actuating tip, the operating lever forms an arcuate or semicircular portion 32 having a radially inwardly extending cam follower or tongue 33.

Each operating lever extends upwardly from its arcuate portion 32 through a slot 34 provided in the top plate 4. The protruding portion of the lever is laterally enlarged to form a head or handle 35 having laterally disposed fulcrum shoulders 36. At the region occupied by the slots 34, the top plate is arched to form an arcuate portion 37, the approximate center of which is near the fulcrum point of the actuating tip 31. The upper surface of the arcuate portion 37 is provided with serrations 38, the purpose of which will be described hereinafter.

Underneath the arcuate portion 37 each timing lever 30 is provided with spring retainer slots 39 which receive one end of a bifurcated U-shaped spring 40. The U-spring bears against the under side of the arcuate portion 37 so as to hold the fulcrum shoulders 36 in the serrations 38.

The arcuate portion 32 for the set of operating levers 30 defines an axis near which is disposed a cam shaft 41 supported in cam shaft bearings 42 clamped between the complementary partitions 5 and 6 and 7 and 8. Press fitted or otherwise permanently secured to the cam shaft is a set of cam sleeves 43, one for each pilot valve unit.

Figure 12:
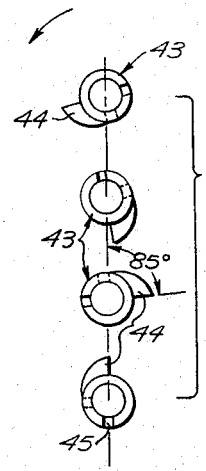
FIGURE 12 is a composite view showing the angular relation of a set of four pilot valve operating cams.
Figure 13:
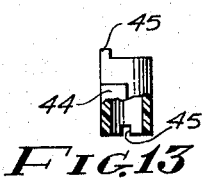
FIGURE 13 is a partial side view, partial sectional view thereof.
Figure 14:
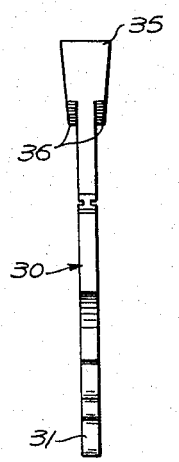
FIGURE 14 is an edge view of one of the operating levers.

The cam sleeves are identical. Each sleeve is provided with a spiral cam 44 occupying slightly less than 90° of an arc; for example, 85° as indicated in FIGURE 12. The opposite axial ends of each cam sleeve are provided with notch and lug means 45 which, when interengaged to dispose the cam sleeves serially, on the shaft, the cut off or high extremities of the cams are in proper arcuate relation with each other.

One end of the cam shaft 41 protrudes through the complementary partitions 7 and 8 and received a clutch cylinder 46 which is press fitted or otherwise secured to the cam shaft. The clutch cylinder 46 is disposed in confronting relation with a second clutch cylinder 47 of slightly smaller diameter and supports the second cylinder 47 in coaxial relation by means of a hub portion 48 extending into a mating aperture in the second clutch cylinder. The second clutch cylinder 47 forms an integral part of a drive shaft 49 and is disposed at one end thereof. The other end of the drive shaft is journaled in the partition 9 and adjacent this end is provided with a spur gear 50. The spur gear is driven by a pinion drive gear 51 extending from an electric timing and gear reducer unit 52 supported from the partition 9.

Intermediate its ends, the drive shaft 49 is provided with a worm 53 which engage a worm gear 54. The worm gear is formed at one end of a worm gear shaft 55 which extends upwardly through the top plate 4. Depending from the top plate 3 is a timer disk housing 56 and a central depending sleeve 57 which journals the shaft 55. Secured to the upper end of the shaft 55 is a timer disk 58 covered by an escutcheon plate 59.

The escutcheon plate and timer disk is provided with a ring of perforations 60, there are preferably forty-eight perforations representing a two day period divided into hourly intervals. Any of the perforations may receive a trigger pin 61. Depending from the top plate 4 is a pivot pin 62 which pivotally supports a trip lever 63. The trip lever extends transversely to the common axis of the drive shaft 55 and cam shaft 41 and terminates in a trip finger 64 disposed radially outward from the cylinders 46 and 47.

Secured to the clutch cylinder 46 is a helically coiled clutch element 65. The clutch element normally grips the second clutch cylinder 47 and is provided with a radial extremity 66 adapted to be engaged by the trip finger 64 in such a manner that the helical coil is prevented from gripping the clutch cylinder 47. The trip lever 63 is provided with a spring 67 which urges the trip lever against a stop 68 so that the trip lever 63 is normally maintained in position for restraining the clutch spring 65 by engagement with its radial extremity 66. The trip lever is provided with a cam surface 69 which underlies the timer disk 48 in the region of the ring of perforations 60 so as to be engaged by the depending lower end of a trigger pin 61, so as to release the clutch spring 65.

Operation of the irrigation controller is as follows:
The extreme serrations 38 provided on the top plate 4 are marked respectively "OFF" and "ON." The intermediate serrations form a scale marked "3," "30" and "60," the numbers representing minutes. As fulcrum shoulders 36 are moved from OFF to ON the corresponding cam follower 33 is moved radially inwardly toward the cam sleeve 43 so as to be engaged by increasing portions of the spiral cam 44. When at the ON position, the cam follower 33 engages the cylindrical portion of the cam sleeve so as to hold the corresponding pilot valve unit in a continuously open position as shown in FIGURE 6. In the intermediate positions of the timing lever 30 the period in which the corresponding pilot valve is held in an open position depends upon the points at which the spiral cam 44 is engaged with the cam follower 33.

The timing disk is preferably provided with forty-eight perforations so that the controller may be operated on alternate days to represent two day intervals. If a pair of trigger pins 61 are used, they may be spaced so that the controller may be operated the same time each day. When a trigger pin engages the trip lever 63, the radial extremity 66 of the clutch element is released. The direction of rotaton of the drive shaft 49 is such that the frictional engagement of the surface of the clutch cylinder 47 by the clutch element tends to tighten the clutch element and thereby drive the cam shaft 41, and cams 44 so as to engage the timing lever 30 in sequence and thereby open the pilot valves in corresponding sequence. In each case the duration of operation is determined by the position of the timing lever and their cam followers with respect to the cams.

It will be observed that the set of pilot valves may be employed to control conventional pilot operated control valves, preferably of the type which open when water bleeds from their pilot lines.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:
1. An irrigation controller, comprising:
 (a) a single piece pilot valve body formed of a tough, slightly yieldable plastic material, said valve body having a set of parallel valve bores, each bore having a port at one end, a valve seat intermediate its ends and a valve chamber continuing therefrom to its other end, said valve chambers being intersected by a common duct;
 (b) a single piece cap strip formed of a tough, slightly yieldable plastic material, said cap strip including a set of sealing elements telescopingly fitting said valve chambers, and a set of valve stem guides coaxial therewith;
 (c) a set of valve elements slidable in valve chambers for engagement with said valve seats and including stems sealingly received in and protruding through said guides;
 (d) a set of springs urging said valve stems toward said seats, whereby the set of pilot valves formed by said valve elements and seats are normally closed;
 (e) a set of timing levers, each operatively connected by one end with a corresponding valve stem to retract the corresponding valve element from its valve seat, each timing lever including a fixed cam follower intermediate its ends and a fulcrum adjacent its other end;
 (f) a cam shaft having a set of cams positioned for sequential engagement by said cam followers;
 (g) and means for receiving said fulcrum elements in various positions to vary the extent of engagement of said cam followers therewith, thereby to vary the period during which said valve elements are held open.

2. A multiple pilot valve for irrigation controllers, comprising:
 (a) a single piece pilot valve body formed of a tough, slightly yieldable plastic material, said valve body having a set of parallel valve bores, each bore having a port at one end, a valve seat intermediate its ends and a valve chamber continuing therefrom to its other end, said valve chambers being intersected by a common duct;
 (b) a single piece cap strip formed of a tough, slightly yieldable plastic material, said cap strip including a set of sealing elements telescopingly fitting said valve chambers, and a set of valve stem guides coaxial therewith;
 (c) a set of valve elements slidable in valve chambers for engagement with said valve seats and including stems sealingly received in and protruding through said guides;
 (d) and a set of springs urging said valve stems toward said seats, whereby the set of pilot valves formed by said valve elements and seats are normally closed.

3. A multiple pilot valve for irrigation controllers, comprising:
   (a) a pilot valve body having a set of parallel valve bores, each bore having a port at one end, a valve seat intermediate its ends and a valve chamber continuing therefrom to its other end, said valve chambers being intersected by a common duct;
   (b) a cap strip including a set of sealing cups closing said valve chambers, and a set of valve stem guides coaxial therewith;
   (c) a set of valve elements slidable in valve chambers for engagement with said valve seats and including stems protruding through said guides;
   (d) a set of springs urging said valve stems toward said seats, whereby the set of pilot valves formed by said valve elements and seats are normally closed;
   (e) and U-shaped clip members embracing said valve body and cap strip to hold said cap strip in place on said valve body.

4. A multiple pilot valve for irrigation controllers, comprising:
   (a) a pilot valve body formed of yieldable plastic material and including a set of parallel valve tubes joined by transverse webs;
   (b) a cap strip formed of yieldable plastic material and including a set of sealing cups and means permitting limited variation in spacing between said sealing cups thereby to permit accommodation of said sealing cups in said valve tubes;
   (c) each valve tube including a valve chamber closed at one end by a sealing cup, a valve seat at the other end of said valve chamber and a flow passage continuing from said valve seat;
   (d) said valve body including a duct extending through said webs and joining said valve chambers;
   (e) and a set of valve elements slidable in said valve chambers and including stems extending through said cap strip.

5. An irrigation controller, comprising:
   (a) a pilot valve body formed of yieldable plastic material and including a set of parallel valve tubes joined by transverse webs;
   (b) a cap strip formed of yieldable plastic material and including a set of sealing cups and means permitting limited variation in spacing between said sealing cups thereby to permit accommodation of said sealing cups in said valve tubes;
   (c) each valve tube including a valve chamber closed at one end by a sealing cup, a valve seat at the other end of said valve chamber and a flow passage continuing from said valve seat;
   (d) said valve body including a duct extending through said webs and joining said valve chambers;
   (e) a set of valve elements slidable in said valve chambers and including stems extending through said cap strip;
   (f) a set of timing levers each operatively connected with a corresponding valve element, each timing lever including a cam follower intermediate its ends and a fulcrum element at its other end;
   (g) a cam shaft traversing said timing levers and having a set of cams positioned for sequential engagement by said cam followers;
   (h) and means for receiving said fulcrum elements in various positions to vary the extent of engagement of said cam followers therewith, thereby to vary the the period during which said valve elements are held open.

References Cited by the Examiner

UNITED STATES PATENTS

| 2,821,434 | 1/1958 | Hunter | 239—70 XR |
| 2,980,393 | 4/1961 | Bauerlein | 251—335 XR |
| 3,128,863 | 4/1964 | Tomkd | 192—81 |

ALAN COHAN, *Primary Examiner.*